Oct. 14, 1941.  A. B. SIMMONS  2,259,006
LENS HOLDER
Filed Oct. 25, 1939  2 Sheets-Sheet 1
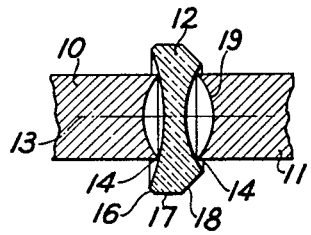
FIG. 1
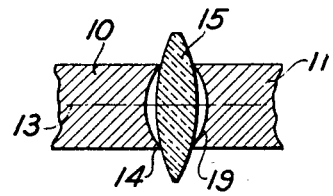
FIG. 2
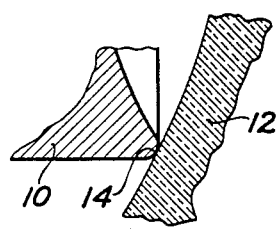
FIG. 3
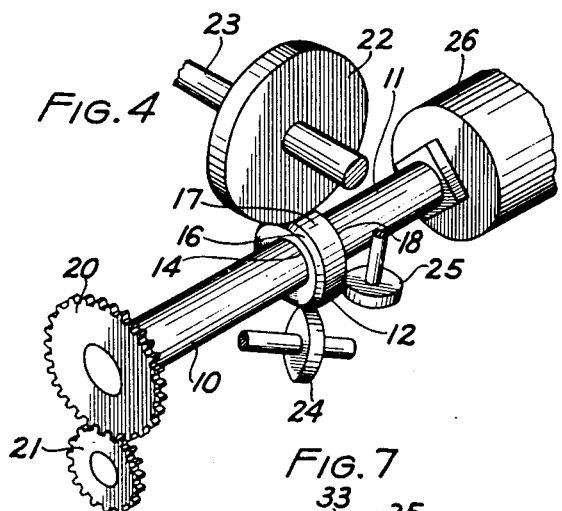
FIG. 4
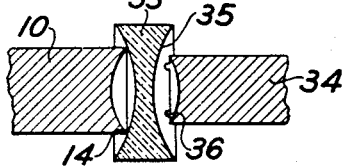
FIG. 7
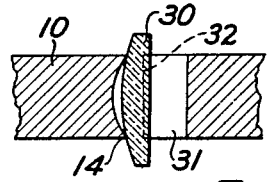
FIG. 5
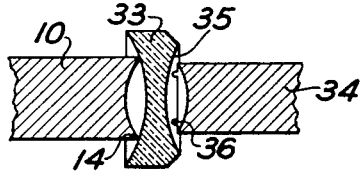
FIG. 8
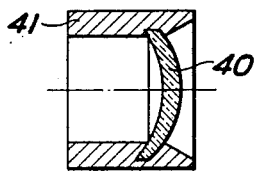
FIG. 6
FIG. 9
ARTHUR B. SIMMONS
INVENTOR
BY
ATTORNEY Oct. 14, 1941.   A. B. SIMMONS   2,259,006
LENS HOLDER
Filed Oct. 25, 1939   2 Sheets-Sheet 2
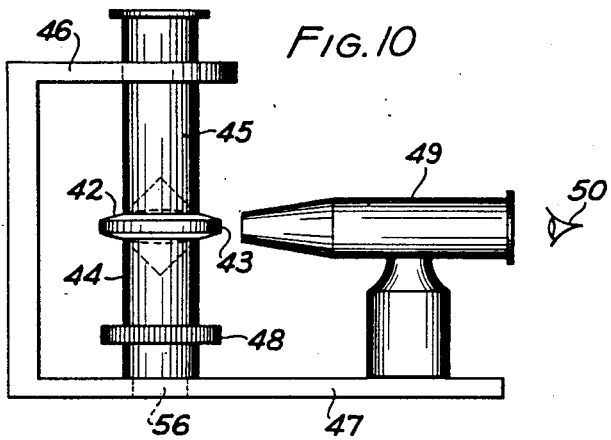
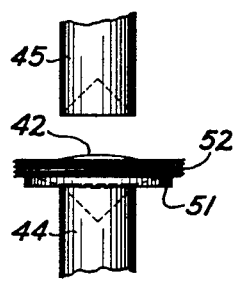
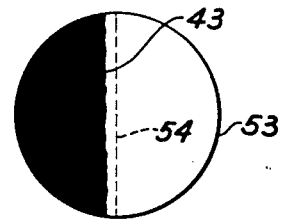
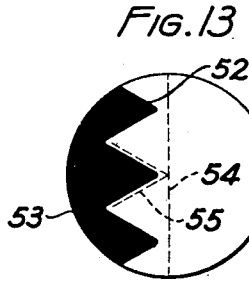
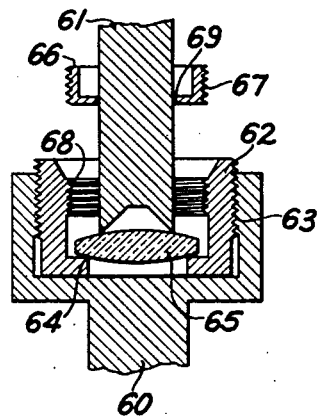
ARTHUR B. SIMMONS
INVENTOR
BY
ATTORNEY Patented Oct. 14, 1941

2,259,006

UNITED STATES PATENT OFFICE 2,259,006

LENS HOLDER

Arthur B. Simmons, Rochester, N. Y., assignor to Eastman Kodak Company, Rochester, N. Y., a corporation of New Jersey Application October 25, 1939, Serial No. 301,195

20 Claims. (Cl. 88—57)

This invention relates to a method and means for holding a lens and for aligning it optically.

It is an object of the invention to provide a method and means for aligning a lens optically, quickly and accurately. It is also an object of the invention to hold the lens when so aligned.

It is an object of one embodiment of the invention to align a lens for inspection of the edge of the lens or of the edge of the lens mount.

It is an object of another embodiment of the invention to align and hold a lens for centering such as by edge grinding or by moulding a plastic rim onto the lens in accordance with the invention of Donald L. Wood on which a copending application, Serial Number 286,386, was filed on July 25, 1939.

It is an object of a third embodiment of the invention to provide a method and means for aligning and holding a lens, particularly an uncentered lens, for assembly in a lens mount.

According to one embodiment of the invention, which is particularly useful with ordinary lenses having spherical refracting surfaces, clamp members are provided for clamping the lens by these surfaces. Each clamp member has a circular and substantially frictionless contacting surface and the two clamp members are concentric preferably with the two contacting surfaces of the same size and thus directly opposite one another. As a lens is clamped between two such clamp members, the lens slips until all of the contacting surface is in contact with the lens at which time, the optic axis of the lens must be and is concentric with the two clamp members. Zonal clamp members of this general type have been known prior to the present invention, but they have not been made substantially frictionless nor have they been used to center a lens. For example U. S. Patent 1,272,474, Long shows cup-shaped lens holders, but follows the common practice of providing suitable pads on the clamp members for receiving and retaining the lens. The usual procedure, when using cup-shaped lens mounts is to center the lens manually, by some visual operation and then to clamp it with the circular concentric clamp members allowing sufficient resiliency in some part of the clamping system so that the clamps do not have to be accurately circular, accurately concentric or accurately parallel. The advantages of having the clamp members absolutely accurate in these respects within small tolerance limits and, which is fundamental, having them substantially frictionless has been overlooked.

When employing the present invention to center a lens, the clamp members make contact with the lens only at one or two points except when the lens is actually centered. That is, the first contact between the clamp and the lens is a single point on each side. Since the lens surfaces are curves and the friction is very small, the lens slips until all of the clamp is in contact with the lens, at which time the lens is optically centered and the surface of contact forms a complete ring. Because of the curvature of the refracting surface of the lens, the lens is prevented from slipping further sideways in any direction even if the contacting surfaces are absolutely frictionless. Rotation of the lens in the clamp is prevented by the small amount of friction which does remain. Thus the term "substantially frictionless" does not mean that the contact is absolutely frictionless, but merely that it is sufficiently frictionless to permit the lens to slip until it is centered.

A more general embodiment of the invention which is applicable to lenses having cylindrical and toric refracting surfaces as well as spherical refracting surfaces, involves contacting surfaces which are not circular but which obviously must conform to the contour line of the refracting surface with which they are in contact. These contour lines are spaced axially and are in planes perpendicular to the optic axis of the lens. The contact surface may be any straight or curved line touching the corresponding contour at all points when the lens is centered but only touching the lens at one or two points when the lens is uncentered. On the other hand, the contacting surface may be only three or four points on this contour line. Obviously, the contacting surface whether it is a complete line such as a circle or three or four points must lie all in one plane which is perpendicular to the optic axis of the lens when centered and must conform to one contour only of the lens surface. For convenience I have coined and used in this specification and the accompanying claims the term "iso-contouric" to define this characteristic of the contact surface which is thus iso-contouric with respect to the lens surface. A series of points and/or lines which lie in one plane may be iso-contouric with respect to a surface. In the simple embodiment of the invention described above, wherein the lens refracting surfaces are spherical or other surfaces of revolution about the optic axis, the iso-contouric surface is a simple circle or any parts or points of this circle. Thus it is not necessary to use the term "iso-contouric" except when describing the invention generically.

When a lens is clamped according to the invention, the axis of concentricity of the two clamp members is coincident with the optic axis of the lens. It is sometimes desirable to have one or both of the clamp members mounted so as to be rotatable about the axis of concentricity. In this case, it is possible to rotate the clamp member slightly as the lens is being clamped and thus to enhance the centering effect of the clamp on the lens. Although rotatability is desirable in one or both of the clamp members, it is not necessary and I have found that even a relatively weak lens such as a one-diopter spectacle lens will center itself within $\frac{1}{1000}$ of a millimeter.

The optical aligning and holding of a lens in this position has several applications. The present broad invention is specifically useful in three of these namely centering, inspecting, and assembling.

The usual way to center a lens is to hold it optically aligned and to edge grind the lens in accordance with this alignment. When applying my invention to edge grinding, I have found that the preferable arrangement requires that the holding cups or clamp members must be clean to prevent scratching, secondly, must rotate synchronously as the grinding action takes place and thirdly, the axes of rotation of the shafts of the two clamp members must be identical, i. e. the turning shafts must rotate concentrically. Although of little importance, there are some cases in which lens peripheries are purposely eccentric with respect to the axis by a predetermined amount; a spectacle lens, for example, could be centered by the invention and then ground eccentric by some well known cam control means or by rotating about some point other than the axis.

Various methods of rotating the shafts synchronously may be employed; I prefer to drive one of the clamp members and permit the other clamp member to be driven by the slight residual friction between this other clamp member and the lens surface. The free moving clamp member may be held under fluid pressure, e. g. air pressure or oil pressure so that it exerts longitudinal pressure on the lens without any appreciable resistance to rotation of the lens and clamp members. The amount of clamping pressure necessary during edge grinding depends on the curvature of the lens surfaces; I have found that pressures on the order of 50 pounds are satisfactory for ordinary photographic lenses.

The invention is not only applicable to holding a lens during centering by edge grinding, but also to holding a lens during centering in accordance with the invention of Donald L. Wood mentioned above.

When applying my invention to the edge inspection of a lens or lens mount, the lens surfaces are clamped according to the invention and the edge to be inspected is viewed tangentially by a microscope of say $100x$ or $1000x$ power. During inspection, the lens in its clamp is rotated about its optic axis which is identical with the axis of concentricity of the clamps. If the lens is not optically centered, the edge thereof is seen to move radially in the field of view of the microscope. This embodiment of the invention is equally applicable to the inspection of screw threads on the outer rim of a mount to determine whether the screw threads are concentric with the optic axis of the lens.

The invention is also applicable to the assembly of lenses, wherein a lens is held in proper alignment while the mount is mounted thereon so that the periphery or assembly threads of the mount is concentric with the optic axis of the lens.

Other objects and advantages of the invention will be fully understood from the following description when read in connection with the accompanying drawings in which:

Fig. 1 shows a bi-concave lens clamped according to the invention.

Fig. 2 shows a bi-convex lens clamped according to the invention.

Fig. 3 shows an enlarged fragmentary detail of Fig. 1.

Fig. 4 shows an edge and bevel grinding machine in accordance with the invention.

Figs. 5 and 6 show respectively a horizontal and vertical cross section of the embodiment of the invention for clamping a spherical cylindrical lens.

Figs. 7 and 8 show respectively a horizontal and a vertical cross section of an embodiment of the invention for clamping a spherical toric lens.

Fig. 9 shows an uncentered lens element centered in a plastic rim.

Fig. 10 shows a device for edge inspecting a lens in accordance with the invention.

Fig. 11 shows a lens in its mount and arranged to be inspected according to Fig. 10.

Fig. 12 shows the field of view of the microscope in Fig. 10.

Fig. 13 shows the field of view of the microscope when viewing the lens mount edge shown in Fig. 11.

Fig. 14 shows a method of assembling a lens in accordance with the invention.

In Fig. 1 a bi-concave lens 12 is clamped by clamp members 10 and 11 having substantially frictionless contacting surfaces 14 which are concentric with one another and in planes perpendicular to the axis 13 of concentricity. As pressure is exerted by the clamp members 10 and 11 on the element 12, the element 12 slips until it is optically aligned in the clamp with the optic axis of the element identical with the axis 13 of concentricity of the clamp. The surfaces of contact 14 are in the form of the rims of cups and the surface 19 of the clamp members inside the contacting surface 14 may have any form provided it does not touch the lens 12. In fact, when clamping bi-concave lenses as shown in Fig. 1, the surface 19 may be perfectly plane.

The contact made between the contacting surface 14 and the lens element 12 is shown enlarged in Fig. 3. With ordinary lenses, I have obtained very satisfactory results using clamping cups with the contacting surface 14 ground to a cross-sectional radius of between .004 and .008 inch. The actual value of this radius of curvature is not as critical as is the fact that there should be no variation in this radius around the contacting surface. I have found it desirable to hold this radius of curvature within plus or minus $\frac{1}{10000}$ of an inch or even less. Obviously, of course, the tolerance limits for these details depend on the accuracy of centering required and hence numerical values have little meaning. However, in general it is preferable to have this contacting surface, as shown, in the form of a major meridian on a convex toric surface whose minor radius of curvature is very small. As pointed out, the two contacting surfaces of the clamp should be parallel and if the clamp members are to be rotated should be perpendicular to the axis of rotation, i. e., the axis of concentricity of the clamp members. An acceptable tolerance limit depending on the quality of centering required, is to have these contacting surfaces in planes which are perpendicular to the axis of concentricity within 5 seconds of angle. The tolerance of concentricity is such that the axis of the shafts should be within $1/10000$ of an inch of the axis of concentricity for each contacting surface.

Fig. 2 shows a bi-convex lens 15 clamped in the same clamp as is shown in Fig. 1. It is obvious from either figure that the curvature of the surfaces of the lens or more exactly the difference between the marginal and paraxial thickness of the lens prevents any sideways motion of the lens when clamped and properly aligned. Except for the slight residual friction existing between the contact surface 14 and the lens, these lenses 12 and 15 are free to rotate about their optic axes.

Fig. 4 shows a device for edge and bevel grinding the element 12 shown in Fig. 1. The shaft 10 is driven by driving means shown as gears 20 and 21 which rotate the lens 12 due to the slight residual friction between the contacting surface 14 and the lens 12. The clamp member 11 is geared to rotate synchronously with the clamp member 10 so as not to scratch the surface of the lens 12 or preferably is mounted so as to be free to rotate and is held against the lens 12 by fluid pressure means 26 to give longitudinal pressure with little rotational resistance. As the lens 12 is rotated by the clamp member 10 the edge 17 of this lens 12 is ground by a grinding wheel 22 rotating on a shaft 23. Similarly the bevel edges 16 and 18 are ground by wheels 24 and 25. With ordinary lenses such as shown, a clamping pressure of 40 or 50 pounds is sufficient to maintain the lens accurately in alignment while the pressure of the edge grinding wheel 22 is exerted radially thereon.

Another method of centering a lens is to hold it in optical alignment and to mould a plastic rim onto the lens in accordance with the invention of Donald L. Wood mentioned above. The present invention may be applied for holding the lens during this operation and the result obtained thereby is shown in Fig. 9 wherein an uncentered lens 40 is centered by moulding a plastic rim 41 thereonto with the periphery of the rim 41 concentric with the optic axis of the element 40.

In general lenses have spherical refracting surfaces or refracting surfaces which are surfaces of revolution about the optic axis such as paraboloids, ellipsoids, etc. Figs. 5 to 8 show an extension of the present invention to the more general case wherein the refracting surfaces may be cylindrical or toric (which is a combination of a spherical surface and a cylinder). In Figs. 5 and 6 a spherical cylindrical lens 30 is clamped between two clamp members 10 and 31 in which the contacting surface 14 of the clamp member 10 is circular as in Fig. 1 and the contacting surface 32 of the clamp member 31 consists of two parallel straight lines which are iso-contouric to the cylindrical surface of the lens 30. Obviously any of the embodiments of the invention described are applicable to various types of lenses and accommodate a considerable range of lenses. For example the clamps shown in Figs. 1 and 2 are applicable to all lenses whether their surfaces are concave, convex, spherical, parabolic, etc. The clamp member 31 in Figs. 5 and 6 may be used with any cylindrical surface within a certain range. Such arrangements have a decided advantage over any embodiment of the invention in which the contacting surfaces are not iso-contouric but are made to fit only one particular lens. This is of course only one of the many advantages of the invention.

In Figs. 7 and 8, a spherical toric lens 33 having a toric surface 35 is clamped according to the invention in which one clamp member 34 has contacting surfaces 36 consisting of four points which are iso-contouric with respect to the toric surface 35. Obviously such an arrangement is applicable to cylindrical or spherical surfaces as well as the toric surfaces, but is much less preferable than those in which the contacting surface is a curved or straight line. In a toric surface, the iso-contouric contacting surface which is a complete line would be in the form of an ellipse and would not be applicable to more than one type of toric surface. However, toric surfaces are rare and the more general application of the invention shown in Figs. 1 and 2 is the most valuable commercially.

Generically the invention relates to holding and aligning a lens optically wherever such alignment is required. In addition to the usual application of any lens aligning system, namely for centering, the invention is also applicable to edge inspection as shown in Figs. 10 and 11 and to lens assembling as shown in Fig. 14. In Fig. 10 a lens 42 whose edge 43 is to be inspected is placed on a clamp member 44 whose contact surface is shaped in accordance with the invention; the clamp member is mounted rotatable on a shaft 56 in a support 47. A suitable knurled handle 48 is provided on the clamp member 44 to permit manual rotation thereof. Vertically above the clamp member 44 and concentric therewith is a clamp member 45 mounted in a support 46 which is carried by the main support 47. When the lens 42 is placed on the clamp member 44 and the clamp member 45 is pressed down thereon preferably with a slight rotary motion, the lens 42 becomes centered in the clamp or support 44. On the support 47 is also mounted a microscope 49 through which an eye 50 may tangentially view the edge 43 of the lens 42. Obviously, the microscope 49 must be adjustable in a horizontal plane to accommodate different size lenses.

The field of view 53 in the microscope 49 is shown in Fig. 12 wherein the edge 43 of the lens 42 appears as a vertical line which is relatively ragged because of the magnification. For convenience a fiducial line 54 is provided in the field of view 53. After the lens is centered according to the invention, the microscope 49 is adjusted horizontally until the edge 53 is seen to be superimposed on this line or crosshair 54. Then the lens 42 is rotated by rotating the amount 44 about its axis and if the lens is not centered the edge 43 as seen in the field of view 53 will move to one side or the other of the line 54. Incidentally, using a 100 times microscope it can easily be demonstrated by shoving the lens to one side and then reclamping it, that it will center itself repeatedly so that the edge 43 always falls on the line 54 and not vary therefrom on repeated settings by any amount perceptible to the eye (i. e. less than $1/1000$ mm.).

An extension of this method of inspecting to the case where the lens 42 is provided with a mount 51 having peripheral screw threads 52 thereon is shown in Fig. 11. The field of view in this case is shown in Fig. 13. If the mount 44 is rotated, the screw threads 52 will be seen to move vertically in the field of view 53. For inspecting threads I prefer to mount the clamp member 44 in the support 47 with screw threads on the shaft 56 which correspond in pitch to the threads 52 to be inspected. With this arrangement, a rotation of the shaft 44 causes the lens to move vertically as well as to rotate so that the threads 52 appear to remain stationary in the field of view 53, providing of course that the threads 52 are perfect. If the threads are not centered on the optic axis of the lens 42, they will move horizontally, i. e. toward or away from the vertical line 54. If the threads are tipped, i. e. the axis of the helical spiral formed by these threads is not coincident with the optic axis of the lens 42, the threads 52 will be seen to move up and down in the field of view during rotation. Two angular fiducial marks 55 are provided as a comparison for the amount of this up and down motion of the threads 52 as the lens is rotated.

Fig. 14 shows the method of assembling an uncentered lens 65 in a mount 62. The mount 62 is provided with a contacting surface 64 which is concentric with the assembly threads 63 which are to be used in assembling this mount in the whole lens system. The mount is screwed into a chuck 60 having threads (corresponding to the mount threads 63) which are concentric with the chuck and hence when the mount 62 is held as shown, the contact surface 64 will be concentric with the chuck 60. The lens 65 is then placed thereon and a clamp member 61 having a substantially frictionless contacting surface in accordance with the invention and concentric with the chuck 60 is brought down on the upper surface of the lens 65. This causes the lens 65 to center itself with respect to the contact surface 64 and hence with respect to the mount assembly threads 63. When in this correctly centered position the lens 65 is secured to the mount by cement or by a lock nut 66 having screw threads 67 which screw into threads 68 in the mount 62. In order to prevent this lock nut 66 having any decentering action on the lens 65, the contacting surfaces of the lock nut could be made concentric, but this would be a very expensive operation since it would be necessary also to have the threads 68 and 67 concentric with the whole system. Therefore it has been found preferable to have some resilient holding means such as having the contacting surface 69 of the lock nut 66 made of malleable material or of spring material such as shown. That is, the section 69 of the lock nut 66 is of a spring material which assumes any reasonable orientation with respect to the lens 65 as the nut is clamped thereon and does not cause any lateral slipping of the lens. In actual practice, the locking nut 66 or a large number of them are slid over the aligning clamp member 61 before the lens is placed on the mount 62. It will be seen that the mount 62 carries one of the contacting surfaces 64 necessary for the invention in this case.

This method of assembling a lens is essentially just another method of centering. In general the lens is optically aligned by clamping in accordance with the invention and the periphery of the lens (including or not including its mount) is made concentric with the axis of concentricity of the clamps. In one case the periphery is made concentric by grinding, in a second case by molding a rim onto the lens and in the third case by mechanically fastening a rim or mount onto the lens.

The rim or mount may have a cylindrical outer surface (instead of threads) to fit in a simple tubular assembly mount. In any case, the assembly control surface (smooth cylindrical or threads) is concentric with the surface of the rim which makes contact with the lens surface.

Having thus described various embodiments of my invention, I wish to point out that it is not limited to the specific structures shown, but is of the scope of the appended claims.

What I claim and desire to secure by Letters Patent of the United States is:

1. Means for holding a lens whose refracting faces are surfaces of revolution about the optic axis of the lens comprising two members of a clamp for clamping opposite faces of the lens symmetrically about the optic axis of the lens, each member having a smooth circular contacting surface of small radius of curvature in section whereby substantially a circumferential line contact is obtained with the surface of the lens, the circular contacting surfaces being concentric, parallel and movable only axially whereby a clamped lens will move laterally under a clamping pressure until the optic axis is concentric with the contacting surfaces.

2. Means for holding a lens having two refractive faces and an optic axis comprising a clamp consisting of two members for clamping each of the two faces symmetrically about the optic axis of the lens, the two members having a common axis of symmetry, each member having a smooth contacting surface of small radius of curvature in section whereby the contact obtained with the surface of the lens will be substantially limited at least to a line contact, said contacting surface consisting of more than two points all of which touch the lens only when it is optically centered in the clamps said points on each member being in one plane perpendicular the common axis of symmetry.

3. Means for holding a lens whose refracting faces are surfaces of revolution about the optic axis of the lens comprising a clamp consisting of two members for clamping with pressure opposite faces of the lens, each member having a smooth circular contacting surface consisting of a major meridian of a convex toric surface whose minor radius of curvature is very small whereby the contact made with a lens face is substantially a circumferential line, and support means for holding the two contacting surfaces concentric and in planes substantially perpendicular to the axis of concentricity, whereby a clamped lens will move laterally under a clamping pressure until the optic axis coincides with the axis of concentricity.

4. Means for holding a lens according to claim 3 in which at least one of the clamp members is rotatable in the support means about said axis of concentricity.

5. Means for holding a lens according to claim 3 in which the clamp members are rotatable in the support means about said axis of concentricity and having means for rotating one of said members, the means supporting the other member including fluid pressure means for exerting large longitudinal clamping pressure with little rotational friction.

6. Means for holding a lens whose refracting faces are surfaces of revolution about the optic axis of the lens comprising a clamp consisting of two members for clamping opposite faces of the lens substantially symmetrically about the optic axis, each member having a smooth contacting surface which is toric, convex toward the other member, with the minor radius of curvature small and held within a tolerance of variation along the surface of plus or minus 1/10000 of an inch, the contacting surfaces of the two members being parallel within a tolerance of ten seconds of angle and being concentric within a tolerance of 1/10000 of an inch whereby a clamped lens will move laterally under a clamping pressure until the optic axis is concentric with the contacting surfaces and until the contact between the lens and the clamp consists of a major meridian of the toric contacting surface of each member.

7. The method of optically aligning a lens having two refractive surfaces, the contours of each surface being in planes perpendicular to the optic axis of the lens, which method comprises placing the lens with one refractive surface against a smooth contacting surface of one member of a two membered clamp which contacting surface is convex to the lens with a small radius of curvature in section and is isocontouric with respect to said refractive surface, whereby the contact obtained with the lens will be substantially limited at least to a line contact, bringing the other member of the clamp concentric with said one member and against the other refractive surface of the lens, which other member also has a smooth contacting surface which is convex to the lens with a small radius of curvature in section and is isocontouric with respect to this other refractive surface, and exerting clamping pressure with the clamp causing the lens to slip laterally until all points of both isocontouric contacting surfaces are touching their respective lens surfaces.

8. The method of optically aligning a lens having two refractive surfaces which are surfaces of revolution about the optic axis of the lens, which method comprises placing the lens with one refractive surface substantially symmetrically against one member of a two membered clamp which member has a smooth circular contacting surface which is toric convex to the lens and has a small minor radius of curvature, placing the other member of the clamp against the other refractive surface of the lens concentrically with said one member, said other member also having a smooth circular contaction surface which is toric convex to the lens and a small minor radius of curvature and exerting clamping pressure with the clamp causing the lens to slip laterally until both contacting surfaces make substantially a uniform circular line contact with the lens.

9. The method according to claim 8 including the step of rotating at least one of the clamp members about the axis of concentricity of the contacting surfaces while exerting said clamping pressure.

10. The method of centering a lens having two refractive surfaces which are surfaces of revolution about the optic axis of the lens which comprises optically aligning it according to claim 8 and then making the periphery of the lens concentric with the contacting surfaces while the lens is so aligned.

11. The method of centering a lens having two refractive surfaces which are surfaces of revolution about the optic axis of the lens which comprises optically aligning it according to claim 8 and then edge grinding the periphery of the lens concentrically with the contacting surfaces while the lens is so aligned.

12. The method of aligning a lens in an individual mount having the surface which contacts one of the faces of the lens, smooth, circular, concentric with the assembly control surface of that mount and convex to the lens with a small radius of curvature in section, which method comprises placing one face of the lens against said surface with the optic axis of the lens inside the circle of contact, placing a clamp member concentric with said surface against the opposite face of the lens, said clamp member also having a contacting surface which is smooth, circular and convex to the lens with a small radius of curvature in section, exerting clamping pressure causing the lens to slip laterally until both contacting surfaces make substantially a uniform circular line contact with the lens and fastening the lens in the mount while so clamped.

13. Means for mounting a lens having two refractive faces which are surfaces of revolution about the optic axis of the lens, comprising a lens mount having a circular surface for contacting one face of the lens substantially with a circular line contact only and having assembly threads concentric with the chuck axis, a clamp member having a smooth circular convex contacting surface with a small radius of curvature in section, for contacting the other face of the lens and for pressing the lens against the contacting surface of the mount, support means for holding the clamp member with its contacting surface concentric with said chuck axis while so pressing, whereby under clamping pressure the lens will slip laterally until its axis coincides with the axis of concentricity of the contacting surfaces and the chuck axis and means for fastening the lens in the mount in the position it assumes under the pressure of the clamp member.

14. Means for mounting a lens according to claim 13 in which the mount also has lock nut threads and the fastening means consists of a lock nut with corresponding threads and a resilient portion for gripping the margin of said other face of the lens.

15. Means for mounting a lens according to claim 13 in which the chuck has threads concentric with its axis for holding the mount by its assembly threads.

16. Means for aligning a lens in an individual mount having a surface which contacts one of the faces of the lens, smooth, circular and concentric with the assembly threads of that mount, the contact being limited substantially to a circular line contact, said aligning means comprising a clamp consisting of two members, one having means for receiving the mount and holding it concentric with the other member which has a smooth circular convex surface of small radius of curvature in section for contacting the other face of the lens and for exerting a clamping pressure which causes the lens to move laterally until its optic axis coincides with the axis of concentricity of the clamp members and the assembly threads.

17. Means for holding a lens whose refracting faces are surfaces of revolution about the optic axis of the lens comprising a clamp consisting of two members for clamping opposite faces of the lens zonally, each member have a substantially frictionless circular contacting surface which is convex toric with a minor radius of curvature which is small whereby the contact obtained with the lens face is limited substantially to a circular line, the contacting surfaces of the two members being concentric, parallel and movable only parallel to the axis of concentricity whereby a clamped lens will move laterally under a clamping pressure until the optic axis is concentric with the contacting surfaces.

18. Means for centering a lens having two refractive surfaces which are surfaces of revolution about the optic axis of the lens, which comprises a clamp consisting of two members for clamping opposite faces of the lens zonally, each member having a substantially frictionless circular contacting surface which is convex toric with a minor radius of curvature which is small whereby the contact obtained with the lens face is limited substantially to a circular line, the contacting surfaces of the two members being concentric, parallel and movable only parallel to the axis of concentricity whereby a clamped lens will move laterally under a clamping pressure until the optic axis is concentric with the contacting surfaces, means for supporting the two members and means carried by the supporting means for edge grinding the periphery of the lens concentrically with the contacting surfaces of the clamp while the lens is clamped in the position it assumes under the clamping pressure.

19. Means for mounting a lens having two refractive faces which are surfaces of revolution about the optic axis of the lens, comprising a lens mount having a substantially frictionless circular contacting surface for contacting one face of the lens zonally with a circular line contact only and having assembly threads concentric with said contacting surface, a chuck for holding the mount with its contacting surface and its assembly threads concentric with the chuck axis, a clamp member having a substantially frictionless convex contacting surface with a small radius of curvature in section, for contacting the other face of the lens and for pressing the lens against the contacting surface of the mount, support means for holding the clamp member with its contacting surface concentric with said chuck axis while so pressing, whereby under clamping pressure the lens will slip laterally until its axis coincides with the axis of concentricity of the contacting surfaces and the chuck axis and means for fastening the lens in the mount in the position it assumes under the pressure of the clamp members.

20. Means for aligning a lens in an individual mount having a surface which contacts one of the faces of the lens substantially frictionless circular and concentric with the assembly threads of that mount, the contact being limited substantially to a circular line contact, said aligning means comprising a clamp consisting of two members, one having means for receiving the mount and holding it concentric with the other member which has a substantially frictionless circular convex surface of small radius of curvature in section for contacting the other face of the lens and for exerting a clamping pressure which causes the lens to move laterally until its optic axis coincides with the axis of concentricity of the clamp members and the assembly threads.

ARTHUR B. SIMMONS.